United States Patent
Wagner-Stuerz

(10) Patent No.: US 9,880,564 B2
(45) Date of Patent: Jan. 30, 2018

(54) POSITION CONTROLLER FOR A PNEUMATIC FIELD DEVICE

(71) Applicant: Samson Aktiengesellschaft, Frankfurt am Main (DE)

(72) Inventor: David Wagner-Stuerz, Muehltal (DE)

(73) Assignee: SAMSON AKTIENGESELLSCHAFT, Frankfurt-am-Main (DE)

(*) Notice: Subject to any disclaimer, the term of this patent is extended or adjusted under 35 U.S.C. 154(b) by 321 days.

(21) Appl. No.: 14/843,159

(22) Filed: Sep. 2, 2015

(65) Prior Publication Data

US 2016/0062368 A1 Mar. 3, 2016

(30) Foreign Application Priority Data

Sep. 3, 2014 (DE) .......... 10 2014 013 098

(51) Int. Cl.
*G05D 7/06* (2006.01)
*F15B 5/00* (2006.01)
(Continued)

(52) U.S. Cl.
CPC .......... *G05D 7/0635* (2013.01); *F15B 5/006* (2013.01); *F15B 20/008* (2013.01); *G05B 15/02* (2013.01); *F15B 19/005* (2013.01); *F15B 2211/3057* (2013.01); *F15B 2211/30565* (2013.01); *F15B 2211/6336* (2013.01); *F15B 2211/6656* (2013.01); *F15B 2211/7052* (2013.01); *F15B 2211/7053* (2013.01); *F15B 2211/863* (2013.01); *F15B 2211/87* (2013.01); *F15B 2211/8757* (2013.01); *F15B 2211/8855* (2013.01)

(58) Field of Classification Search
CPC ....... G05D 7/0635; G05B 15/02; F15B 5/006; F15B 20/008
See application file for complete search history.

(56) References Cited

U.S. PATENT DOCUMENTS 5,565,174 A * 10/1996 Burns .................. B01J 19/0006
422/131
2008/0149186 A1* 6/2008 Martin ................. G05D 7/0647
137/85

(Continued)

FOREIGN PATENT DOCUMENTS

DE 4005546 A1 8/1991
DE 102008053844 A1 5/2010
DE 102012021388 A1 4/2014

*Primary Examiner* — Vincent Tran
(74) *Attorney, Agent, or Firm* — Schiff Hardin LLP

(57) ABSTRACT

The position controller for a pneumatic field device comprises a current-pressure transducer system having at least two I/P-transducers creating separate pneumatic control signals. Microelectronics creates at least two electrical control signals for the I/P-transducers. A pneumatic signal switching valve has at least two pneumatic inputs for the at least two pneumatic control signals, a pneumatic output for transferring a pneumatic control signal to a working chamber of the pneumatic field device and an electrical switch signal input. The pneumatic signal switch valve comprises a first switch position which blocks a first of the at least two pneumatic control signals and a second switch position which blocks a second of the pneumatic control signals.

11 Claims, 4 Drawing Sheets

(51) Int. Cl.
    *G05B 15/02*     (2006.01)
    *F15B 20/00*     (2006.01)
    *F15B 19/00*     (2006.01)

(56) References Cited

U.S. PATENT DOCUMENTS

| | | | |
|---|---|---|---|
| 2009/0199703 A1* | 8/2009 | Hoffmann | F15B 11/028 91/361 |
| 2010/0132542 A1* | 6/2010 | Kolbenschlag | F15B 11/08 91/361 |
| 2014/0116241 A1* | 5/2014 | Valentin-Rumpel | F15B 5/006 91/361 |
| 2014/0117263 A1* | 5/2014 | Valentin-Rumpel | F15B 5/006 251/25 |

\* cited by examiner

POSITION CONTROLLER FOR A PNEUMATIC FIELD DEVICE

BACKGROUND

The disclosure relates to a position controller for a pneumatic field device, such as a pneumatically driven control valve or safety valve, of a process plant, such as a refinery, a food product plant, a brewery, or a petro-chemical plant, or the like.

Position controllers used in process plants have to face high requirements regarding operational safety, control accuracy and ease of maintenance. When processing hazardous substances or products which have to be hygienically flawless or flawless in their composition, high costs arise from malfunctions of individual process control components and/or maintenance service as well as downtimes possibly related thereto.

A flexible pneumatic actuator system having a position controller for driving a control valve of a process plant is know from DE 10 2012 021 388 A1. The known actuator system solves complicated control engineering tasks in that the pneumatic actuator comprises several I/P-transducers for creating several control pressure signals and leads the control pressure signals together before they act upon the working chamber. Through the plurality of I/P-transducers utilized in the known actuator system, the risk of malfunction is increased. Statistical investigations have shown that errors of pneumatic actuator systems can often be traced back to defects of I/P-transducers and pneumatic amplifiers because these are subjected to electromechanical as well as fluid mechanical loads. In the known pneumatic actuator system it was shown that even a defect in just one I/P-transducer leads to an impairment of the entire actuator system. For applications with a high demand of availability or safety-critical plant parts the known system can thus only be used to a limited extent.

SUMMARY

It is an objective to provide a position controller which overcomes the disadvantages of the prior art and in particular comprises a high availability and is suitable for safety-critical deployment scenarios.

The position controller for a pneumatic field device comprises a current-pressure transducer system having at least two I/P-transducers creating separate pneumatic control signals. Microelectronics creates at least two electrical control signals for the I/P-transducers. A pneumatic signal switching valve has at least two pneumatic inputs for the at least two pneumatic control signals, a pneumatic output for transferring a pneumatic control signal to a working chamber of the pneumatic field device and an electrical switch signal input. The pneumatic signal switch valve comprises a first switch position which blocks a first of the at least two pneumatic control signals and a second switch position which blocks a second of the pneumatic control signals.

DESCRIPTION OF EXEMPLARY EMBODIMENTS

Figure 1:
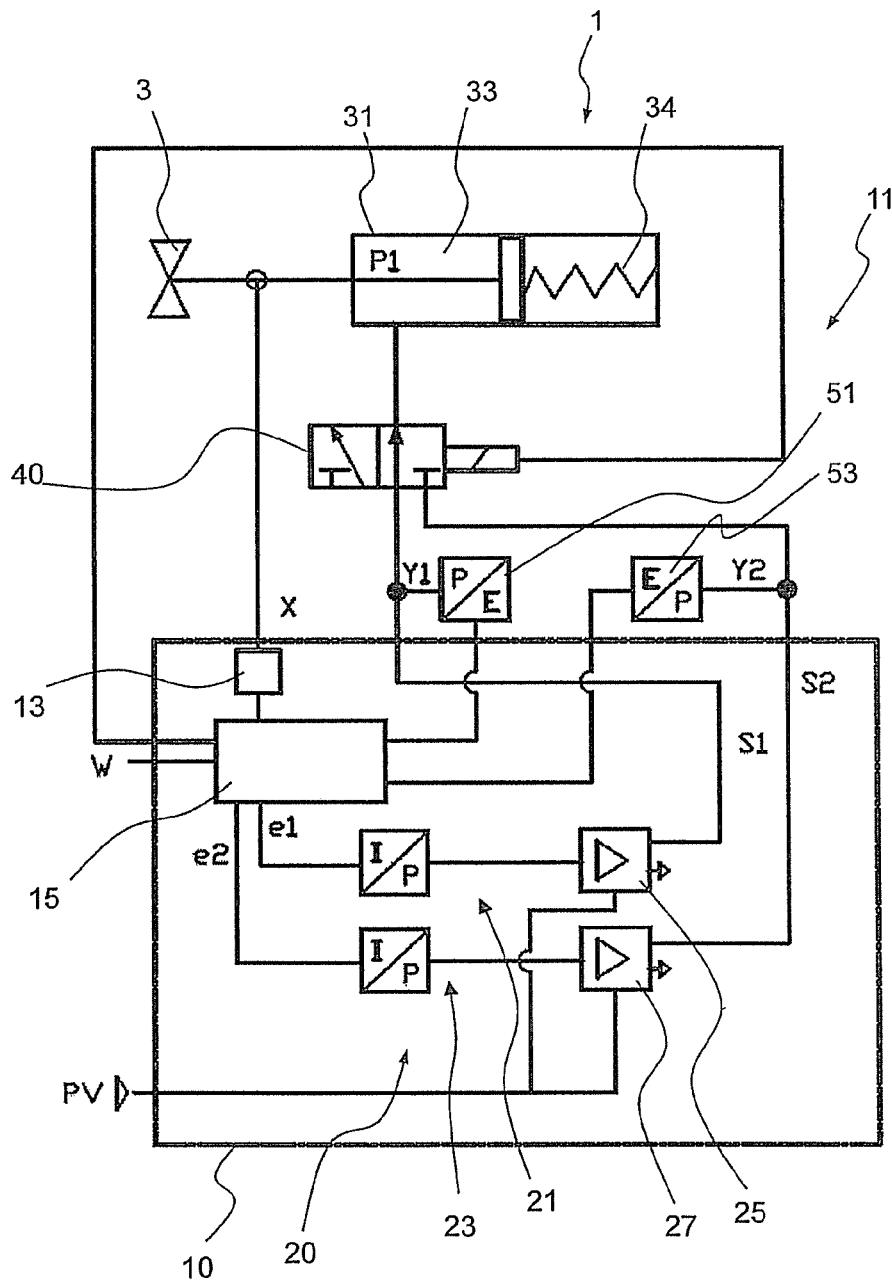
FIG. 1 is schematic illustration of the first embodiment of the position controller according to the invention.

For the purposes of promoting an understanding of the principles of the invention, reference will now be made to the preferred exemplary embodiments/best mode illustrated in the drawings and specific language will be used to describe the same. It will nevertheless be understood that no limitation of the scope of the invention is thereby intended, and such alterations and further modifications in illustrated embodiments and such further applications of the principles of the invention as illustrated as would normally occur to one skilled in the art to which the invention relates are included herein.

A position controller for a pneumatic field device, such as a pneumatically driven control valve or a safety valve of a process plant, comprises a current-pressure transducer system having at least two I/P-transducers for creating at least two particularly separate pneumatic control signals, microelectronics for creating at least two electronic control signals for the at least two I/P-transducers, and a pneumatic signal switch valve having at least two inputs for the at least two pneumatic control signals, a pneumatic output for transferring or relaying a pneumatic control signal to a working chamber of the pneumatic field device and an electric switch signal input. The pneumatic signal switch valve comprises a first switch position in which it blocks the first of the at least two pneumatic control signals and a second switch position in which it blocks the other one or the second of the at least two pneumatic control signals.

The pneumatic signal switch valve allows excluding one particularly pneumatic control signal from the working chamber supply. In safety-critical deployments, the concerned pneumatic input of the pneumatic signal switch device can thus be shut in certain operating situations, for instance when a malfunction in the creation of one of the at least two pneumatic control signals is detected, so that the working chamber is not subjected to the pneumatic control signal which may contain errors. By blocking the control signal which may contain errors, the pneumatic field device automatically takes the safety position which is predetermined for the field devices of process plants so that the plant is in any case brought to a predefined condition. Preferably, the pneumatic signal switch valve is configured such that the other one of the at least two pneumatic control signals is fed to the pneumatic input when the first control signal is blocked. Thus, a redundancy is achieved for the pneumatic control signal for acting upon the working chamber so that a high failure safety is guaranteed.

The pneumatic signal switch valve comprises an electrically settable signal transmission mechanism which, dependent on the switch position, connects one or several ones of the at least two inputs to the particularly exactly one pneumatic output, or which separates one or more of the at least two inputs from the pneumatic output. It shall be clear that the pneumatic signal switch device can also comprise three, four, or more inputs for three, four or more pneumatic control signals which are selectively blocked individually or in combination, or which are selectively connected to the pneumatic output individually or in combination. Therefore the pneumatic signal switch valve comprises two, three, four, or more switch positions which conform to certain combinations of control signal blocking and transmission. Selectively switching the control signals on and off for the pneumatic working chamber can thus be reached with the pneumatic signal switch valve. The pneumatic signal switch valve can receive a switch signal from an external monitoring device of the process plant and/or from the microelectronics of the field device. Preferably the pneumatic signal switch valve comprises more than two switch positions for driving or controlling one respective electric switching signal input for each switch position, or the switch positions are assigned to respective signal threshold values of one single signal input. The pneumatic signal switch valve can also be provided with a digital interface for driving or controlling the switch positions.

In a preferred embodiment, the microelectronics is configured such that, in case of a predetermined operating condition, the pneumatic signal switch valve and/or a pneumatic supply switch valve is switched between the first and the second switching condition or between the first and a third, fourth, or other switch condition. Thus, the microelectronics sends a switch signal to the electrical switch signal input. The microelectronics can be realized as a microprocessor or digital logic, such as a FPGA-module. In particular, the microelectronics receives the information concerning the presence of a certain operating condition from a process monitoring unit external of a position controller. Preferably, the microelectronics executes one or more monitoring routines in order to detect a predetermined operating condition or operating situation. It shall be clear that the microelectronics can also be configured to detect and distinguish different predetermined operating conditions as well as driving the pneumatic signal switch valve in accordance with a rule of decision such that a switch position previously assigned to one respective predetermined operating situation is taken.

In a preferred embodiment, the pneumatic signal switch valve comprises one switch condition or state in which several of the at least two pneumatic control signals are transferred. By selectively forwarding or transferring one or multiple pneumatic control signals, a supply to the working chamber of the pneumatic field device adapted to certain operating conditions can be realized. For instance in case of high loads, additional air volume can be switched on. In particular the pneumatic signal switch valve comprises one condition in which all pneumatic control signals are blocked. In this embodiment, the pneumatic field device can reach the safety position even in case of malfunctions of all pneumatic control signals, since the working chamber is completely shielded from erroneous control signals.

In a preferred embodiment, the microelectronics is configured such that, in case of a predetermined operating situation or condition, such as a malfunction of a current-pressure-transducing device, one of the at least two electrical control signals is deactivated and another one of the at least two electric control signals is activated.

In particular, the microelectronics is configured such that in case of a malfunction of the current-pressure transducer system, the malfunction is attributed to one of the at least two I/P-transducers and the electric control signal of this I/P-transducer is deactivated. The microelectronics activates the other one of the at least two electrical control signals, provided that it is not yet actuated. Microelectronics is further configured to bring the pneumatic signal switch valve into a switch position in sync to the deactivation of the first electrical control signal, in which switch position in the pneumatic control signal of the I/P-transducer is interconnected to the pneumatic output. Preferably, the at least two electrical control signals are created electrically identical and particularly mutually exclusively.

In a preferred embodiment the microelectronics is connected to a position sensor for determining a valve position of the field device and/or for determining a position of the movable I/P-transducer-component of one respective one of the at least two I/P-transducers. In particular the position sensor is realized for determining the position of the rocker or of a valve piston of one respective one of the at least two I/P-transducers and/or one respective pneumatic amplifier. The position sensor can also be realized as a path sensor. Additionally or alternatively the microelectronics is connected to a pressure sensor for determining a respective pressure of the at least two pneumatic control signals. The microelectronics is particularly configured for recognizing the predetermined operating situation depending on the valve position, the position of the movable I/P-transducer component, a control signal pressure and/or an electric control signal. The microelectronics receives position-, path-, and/or pressure-signals and examines these according to a monitoring routine. Due to the different measurement principles used an assertion can reliably be made regarding the operating condition and/or a malfunction in particular of the current-pressure-transducing device even in view of high reliability demands.

In a preferred embodiment the microelectronics is configured such that at least one reference curve over time of the valve position of the field device, a position of at least one movable I/P-transducer component, a pressure of one of the at least two pneumatic control signals or one of the at least two electric control signals can be stored. Additionally or alternatively the microelectronics is configured for storing the reference curve over time of the relation between one of the aforementioned operating parameters with respect to one or more other ones of the aforementioned operating parameters. For recognizing the predetermined operating condition, the microelectronics compares the stored reference curve over time with a currently measured curve over time. Therefore the microelectronics can comprise a long-term storage in which the at least one reference curve over time is stored as well as a second short-term storage, such as a ring buffer or ring memory, into which the currently measured curve is filed. By comparing the stored reference curve to the currently measured curve the microelectronics decides in particular taking into consideration a tolerance-range whether and/or which predetermined operating situation is present. In particular the microelectronics recognizes, by making a comparison of the pressure of the pneumatic control signal with respect to the electrical control signal, whether the current-pressure transducer system of the respective I/P-transducer works properly. If this is not the case, the microelectronics deactivates the respective electric control signal and/or sends a switch signal to the pneumatic signal switch valve for blocking the malfunctioning pneumatic control signal. With the aid of the monitoring routine of the microelectronics potential errors of the field device can immediately be recognized and be fixed by switching.

In a preferred embodiment the pneumatic signal switch valve comprises an electrically switchable piston mechanism having several switch positions. In particular the piston mechanism mutually exclusively guides the pneumatic inputs towards the pneumatic output. Preferably the pneumatic signal switch valve is realized as an electrically switchable 3/2 way control valve. This relatively simple embodiment allows to flexibly switch the control signal in order to increase the redundancy of the position controller.

In a preferred embodiment the at least two I/P-transducers each comprise one pneumatic amplifier for increasing the amount of air of the at least two pneumatic control signals.

The at least two pneumatic amplifiers are connectable to a pneumatic supply by means of a pneumatic supply switch valve. The pneumatic supply switch valve comprises a first switch position in which it connects the first one of the at least two pneumatic amplifiers to the pneumatic supply, as well as a second switch position in which it connects the other one or second of the at least two pneumatic amplifiers to the pneumatic supply and separates the first of the at least two pneumatic amplifiers from the pneumatic supply. The separation of one of the at least two pneumatic amplifiers from the pneumatic supply allows in case of leakage within the I/P-transducers or within a signal curve of the pneumatic control signal, to take the pneumatic amplifiers out of operation so that the air consumption of the position controller is reduced. In particular, the pneumatic supply switch valve is structured according to the pneumatic signal switch valve and driven by the microelectronics in the same way.

In a preferred embodiment for a double-acting actuator of the pneumatic field device, the position controller comprises two pneumatic signal switch valves, each one comprising at least two inputs for at least two pneumatic input signals, a pneumatic output for transferring a pneumatic control signal to a respective working chamber of the double-acting actuator, and each comprising a first electric control signal input. In particular the position controller is configured such that the same electrical control signal is fed to the control signal inputs. With the aid of one respective pneumatic signal switch valve for either one of the working chambers of the double-acting actuator, the position controller can be protected from erroneous control signals with respect to both directions of movement. In particular the position controller comprises exactly three I/P-transducers of which a first I/P-transducer creates a first pneumatic control signal on the basis of a first electric control signal for the first working chamber of the double-acting actuator and a second I/P-transducer creates a second pneumatic control signal on the basis of a second electrical control signal for the second working chamber of the double-acting actuator. The third I/P-transducer creates, based on a third electrical control signal, the third pneumatic control signal which is being fed via a distributor to the first pneumatic signal switch valve as one of the at least two pneumatic control signals and to the second pneumatic control signal valve as one of the at least two pneumatic control signals. In this embodiment it is particularly advantageous that any one of the three I/P-transducers can fail without impairing the control of the control device.

In a preferred embodiment, the microelectronics and the current-pressure-transducer device are arranged within a common controller housing, wherein in particular the at least two I/P-transducers are pluggably or releasably received within the controller housing, preferably pluggable and releasable without tools. It shall be clear that the pneumatic signal switch valve and/or the pneumatic supply switch valve can also be arranged within the controller housing in order to create a compact mounting unit.

Further properties, advantages and features of the exemplary embodiments will be described by the following description of the preferred embodiments based on the accompanying drawings.

In FIG. 1 the position controller 11 according to one exemplary embodiment is shown in conjunction with a pneumatic field device 1 which has a single-action pneumatic actuator 31 or pneumatic drive with one pneumatic working chamber 33 as well as a biasing spring 34. The pneumatic actuator or drive 31 is coupled to the valve 3 in a movement-control-transferring manner.

The position controller 11 is arranged in a preferably fluid tight sealed controller housing 10. The position controller for 11 comprises microelectronics 15, a position detector 13, and a current-pressure transducer system 20. The position controller 11 receives a target position signal W for the valve 3, for instance from a process control station. Furthermore the position controller 11 comprises an electrical switch output connected to an electrically operatable pneumatic signal switch valve 40 which in one embodiment is realized as a 3/2-way control valve.

The current to pressure transducer system 20 is formed by a first I/P-transducer 21 having a pneumatic amplifier 25 as well as a second I/P-transducer 23 having a second pneumatic amplifier 27. The first I/P-transducer 21 receives an electrical control signal e1 from microelectronics 50 and transforms or transduces said signal into a pneumatic pre-control signal or pilot signal which is transferred to the first pneumatic amplifier 25. The pilot signal of the first I/P-transducer 21 is amplified via the first pneumatic amplifier 25 for forming or creating a first pneumatic control signal $S_1$. The second I/P-transducer 23 translates an electrical control signal e2 received by the microelectronics 15 into a pilot pressure which is amplified by the second pneumatic amplifier 27 for creating a second pneumatic control signal $S_2$. The pneumatic amplifiers 25, 27 are connectable to an external pneumatic compressed air source or pressurized air source by means of a pneumatic interface in the controller housing 10. The microelectronics, depending on the operational mode thereof, permanently supplies identical electrical control signals e1, e2 or activates and deactivates, dependent upon the operational situation, selectively one or both of the electrical control signals e1, e2.

The position controller 1 includes a first pressure sensor 51 connected to the microelectronics 15, which sensor determines the pressure of the pneumatic control signal $S_1$ and provides this as a pressure signal to the microelectronics 15. A second pressure sensor 53 which determines the pressure of the pneumatic control signal $S_2$ is also connected to the microelectronics 15 and communicates a pressure signal concerning the second pneumatic control signal $S_2$.

The position controller 11 comprises a first pneumatic output for the pneumatic control signal $S_1$ and second pneumatic output for the pneumatic replacement-control signal $S_2$.

The pneumatic outputs are connected to a respective pneumatic entry or input of the pneumatic signal switch valve 40. The pneumatic signal switch valve 40 has exactly one pneumatic output which is connected to the working chamber 33 of the pneumatic actuator 31 and the pneumatic signal switch valve 40 further has an electrical switch connection connected to the microelectronics 15.

The pneumatic signal switch valve 40, dependent upon the electrically activated switch position, connects either the first input, to which the pneumatic control signal $S_1$ is supplied, to the working chamber 33, or exclusively second input, to which the control signal $S_2$ is supplied.

Microelectronics 15 is programmed such that it permanently examines, according to a monitoring routine, the signals of the position detector 13 as well as the signals of the pressure sensors 51, 53 with respect to two sensors signals expected during normal operation. In case the position controller 11 detects a deviation from normal operation, the microelectronics verifies whether the deviation can be traced back to a malfunction in the current-to-pressure transducer system and, if applicable, which one of the I/P-transducers 21, 23 is responsible.

In case the microelectronics has recognized a malfunction of the current-to-pressure transducer system and the responsible I/P-transducer 21, 20, it sends a switch signal so that the pneumatic signal switch valve 40 is switched and the control signal of the malfunctioning I/P-transducer is blocked. The microelectronics 15 possibly synchronously activates the electronic control signal of the respective other I/P-transducer 21, 23.

For the recognition of malfunctioning, several monitoring routines are filed in the position controller 11, which, dependent on the configuration of the position controller, are processed individually or in a discretionary combination thereof within the microelectronics 15.

According to a pressure monitoring routine, the position controller compares a pressure value expected for the pneumatic control signal $S_1$ calculated on the basis of the electric control signal e1 and compares this value to the measured pressure signal provided by the pressure sensor 51. In case the measured pressure signal exceeds or falls below a tolerance range surrounding the pressure value to be expected, a malfunction in the creation of the pneumatic control signal is to be assumed. In the same way, the creation of the pneumatic control signal $S_2$, based on the electronic control signal $e_2$, can be performed.

According to a positioning error detection routine, the position controller 11 detects the position of the control valve 3 with the aid of a positioning detector 13. When the positioning target value signal W changes in the course of time, the microelectronics 15 examines whether the positioning signal of the control valve 3 changes in accordance with the electrical control signals e1, e2 created according to the positioning target value signal W. If the measured position signal remains unchanged, a positioning error is to be assumed. The positioning error recognition routine can also be applied with respect to any movable component of the I/P-transducers, such as the position of the piston valve or a signal throttle rocker, so that it can be identified whether and which one of the I/P-transducers 21, 23 is responsible for the positioning error.

When one I/P-transducer is identified as the source of error, switching from one pneumatic control signal to the other pneumatic control signal allows that the plant can be kept running until a next prescheduled maintenance target date.

For a time-curve-monitoring routine, a reference curve for the path of the valve 3 during positioning and/or a reference curve of one respective piston valve or throttling rocker is filed in the position controller. In case the current curve as measured by the position detector 13 for the piston valve (not shown in detail) deviates from the reference curve under consideration of a tolerance range, a malfunction in the creation of the pneumatic control signal can be assumed.

Figure 2:
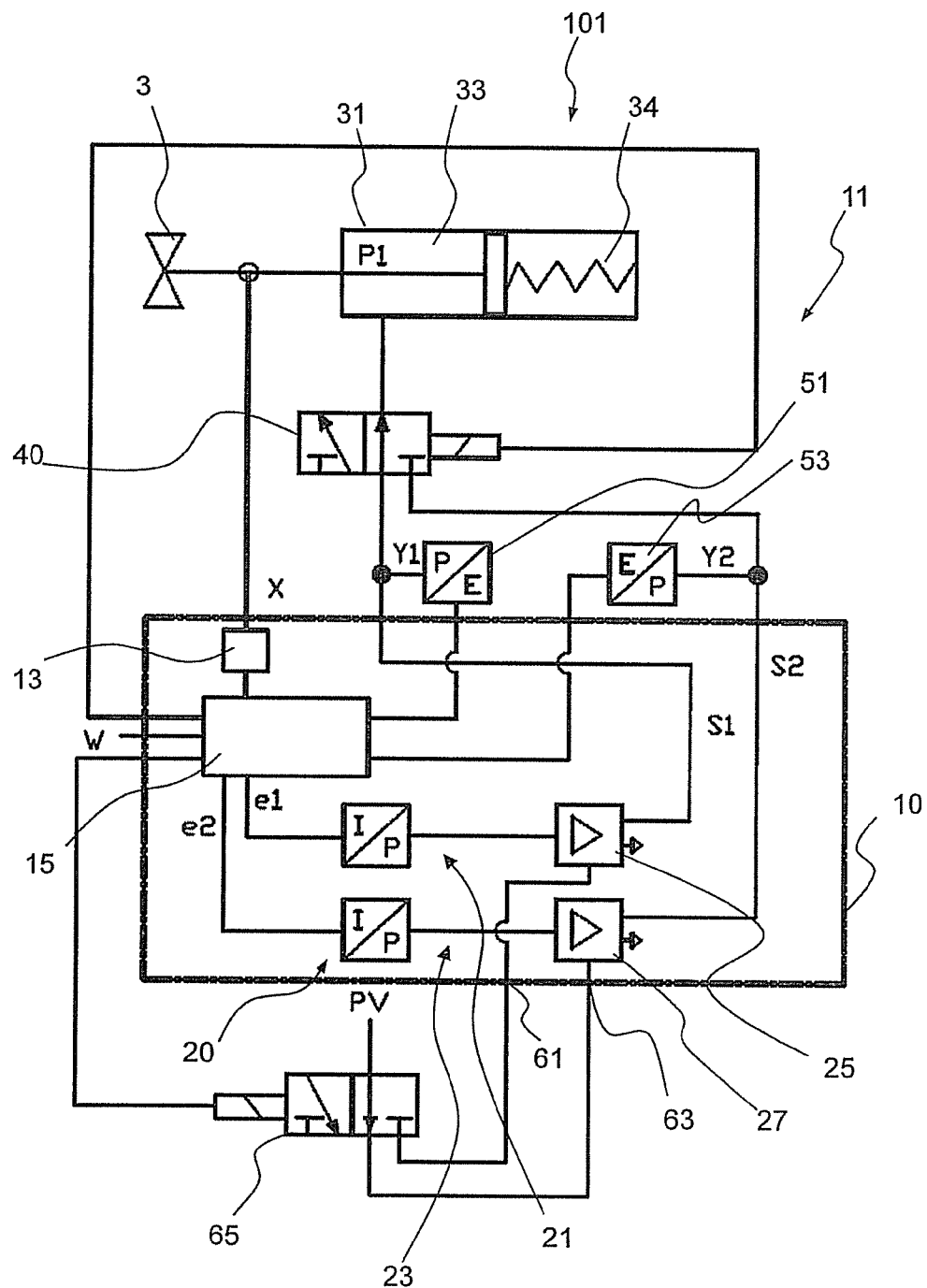
FIG. 2 is schematic illustration of the second embodiment of the position controller according to the invention.

In FIG. 2, a second embodiment of a position controller 111 is shown which essentially corresponds to the embodiment according to FIG. 1. The same elements of the figures are indicated with the same reference numerals. Different elements have reference numerals increased by 100.

The position controller 111 differs from the position controller 11 in that the first pneumatic amplifier 21 of the second pneumatic amplifier 23 each have a separate pneumatic connection 61, 63 for connecting to a pneumatic supply. The supply connections 61, 63 are connected to the pneumatic supply PV via a pneumatic supply or signal switch valve 65 which connects the pneumatic supply mutually exclusive to either the pneumatic amplifier 21 or to the replacement pneumatic amplifier 23. The pneumatic signal switch valve 65 or pneumatic supply switch valve is realized as an electrically switchable 3/2-way control valve and electrically controlled by the microelectronics 15. Switching the pneumatic supply PV occurs simultaneously to switching the pneumatic signal switch valve 40.

Figure 3:
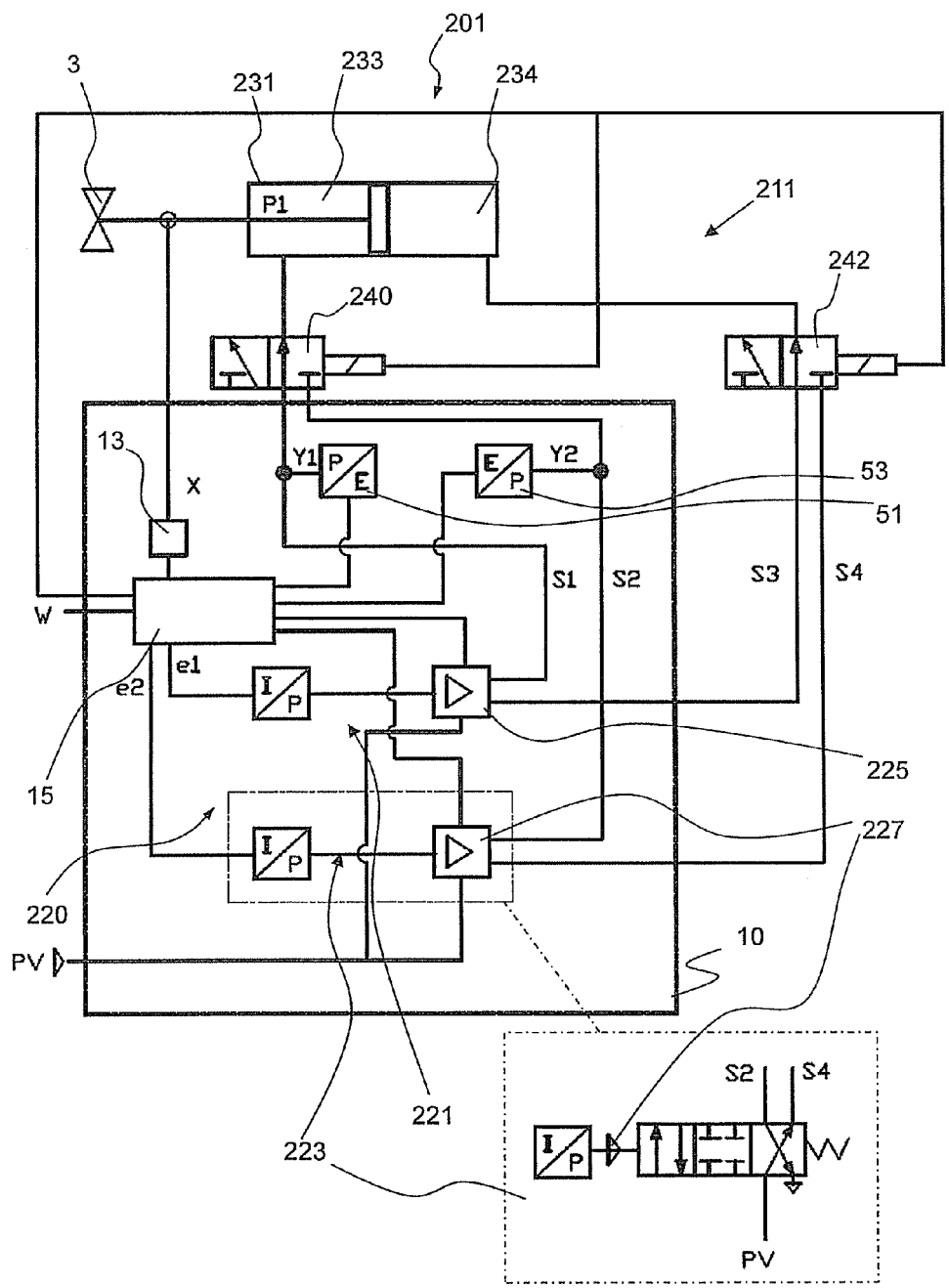
FIG. 3 is schematic illustration of a third embodiment of the position controller according to the invention.

The embodiment illustrated in FIG. 3 of a position controller 211 according to an exemplary embodiment is in many aspects equal to the position controller 11 according to FIG. 1. The same elements of the illustrations have the same reference numerals. Changed elements have reference numerals increased by 200.

The pneumatic field device 201 according to FIG. 3 differs from the pneumatic field device 1 in that it comprises a double-acting pneumatic actuator or drive 231 having a first pneumatic working chamber 233 as well as a second pneumatic working chamber 234. The position controller 211 comprises a current-to-pressure transducer system which is configured in order to create a respective first pneumatic control signal $S_1$, $S_3$ as well as a respective second pneumatic control signal $S_2$, $S_4$ for one respective working chamber 233, 234. For this purpose the I/P-transducer 221 comprises a switch valve within the pneumatic amplifier 225 which, in a first switch position, supplies a transduced and amplified pneumatic control signal $S_1$ to the first pneumatic input of the pneumatic signal switch valve 240 and which bleeds the second working chamber 234. In a second switch position the switch valve transfers the amplified control signal $S_3$ to the second working chamber 234 and bleeds the first working chamber 233. The embodiment of the I/P-transducer 221 having a downstream switch valve is illustrated in a detailed view surrounded by a dashed line according to the I/P-transducer 232 having the same construction. The second I/P-transducer 223 is realized according to the first I/P-transducer 221 and can replace one respective control signal $S_1$ or $S_3$ of the first I/P-transducer 223 as soon as a respective one of the pneumatic signal switch valves 240, 242 allows access to the working chambers 233, 234.

For switching between the control signals $S_1$, $8_3$ and control signals $S_2$, $S_4$, the switch valves 240, 242 are controlled synchronously via a common switch output of the microelectronics 15 of the position controller 211. In the illustrated switch position, a normal operation occurs in which the I/P-transducer 221 supply a pneumatic control signal $S_1$ to the working chamber 233 or a pneumatic control signal $S_3$ to the working chamber 234, depending upon the switch position of the integrated switch change valve. If the position controller detects a malfunction according to one of the aforementioned monitoring routines, the position controller 211 switches the pneumatic signal switch valves 240, 242 and possibly activates the electrical control signal e2 for the I/P-transducer 223.

Figure 4:
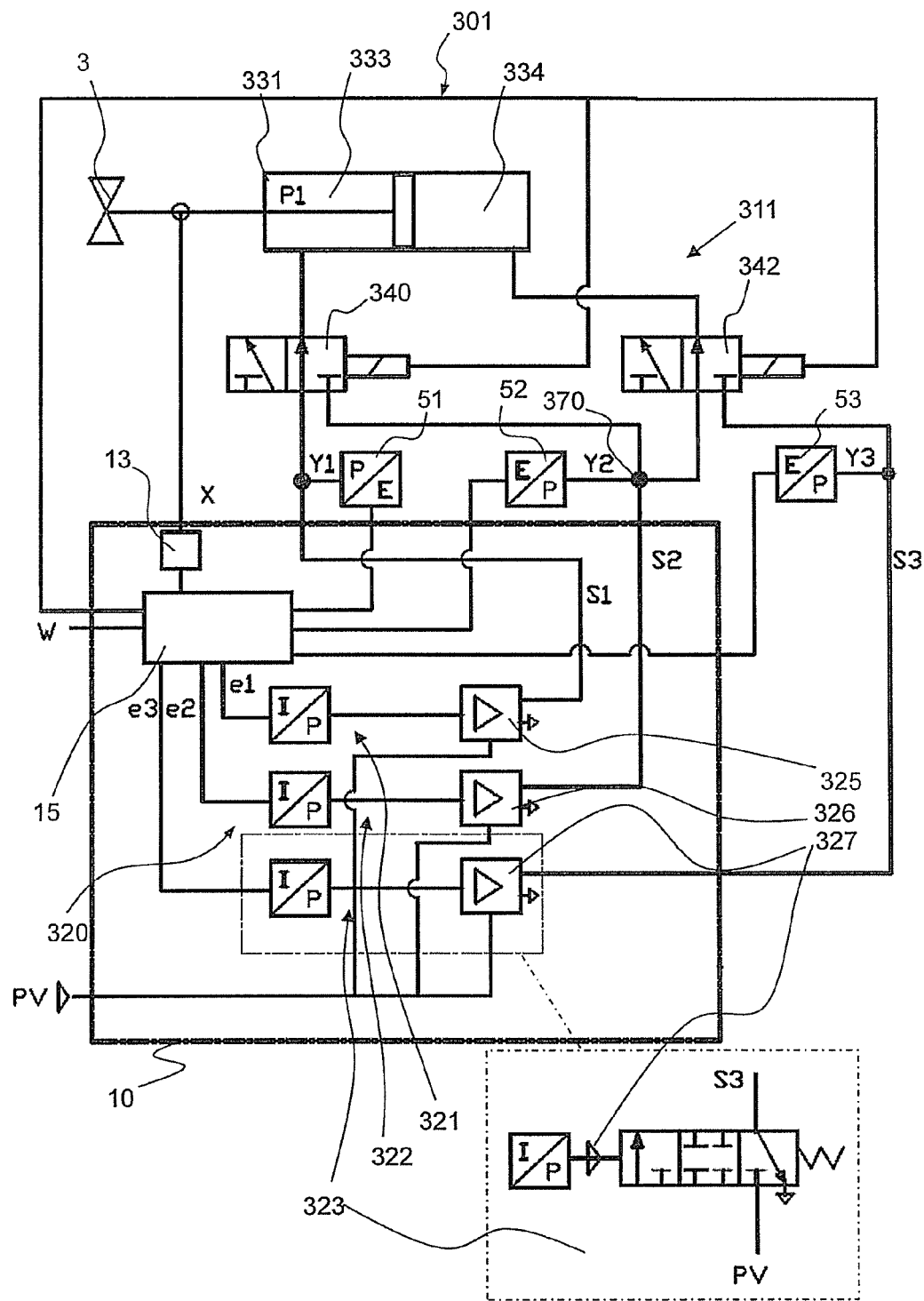
FIG. 4 is schematic illustration of a fourth embodiment of the position controller according to the invention.

The fourth embodiment of a position controller 311 according to the exemplary embodiment is illustrated in FIG. 4. The position controller 311 differs from position controller 211 according to FIG. 3 particularly in that the current-to-pressure transducer system 320 includes three I/P-transducers 321, 322, 323 working independently of one another, which receive electric control signals e1, e2, e3 from the microelectronics 15. The pneumatic control signal $S_2$ of the I/P-transducer 322 is divided at a signal distributor 370. In the double-acting actuator 331, the first working chamber can be supplied with a control signal through the pneumatic output of the pneumatic switch valve 340. The second working chamber 324 can be supplied with a pneumatic signal through the pneumatic output of the second pneumatic signal switch valve 342. The pneumatic signal switch valves 340, 342 are configured like the pneumatic switch valves 240, 242. However, the second input of the first pneumatic signal switch valve 340 the first input of the second pneumatic signal switch valve 342 are supplied with the control signal $S_2$ of the second I/P-transducer 322. The second input of the second pneumatic signal switch valve 342 is supplied with the third control signal $S_3$ of the I/P-transducer 322. Furthermore, the position controller 311 differs from the position controller 211 in that the I/P transducers 321, 322, 323 include a 3/3-way control valve which can output a respective control signal $S_1$, $S_2$, $S_3$ or can bleed the control signal line.

In the illustrated switch position of the pneumatic switch valves 340, 342, the first working chamber 333 can be aerated or ventilated and the second working chamber 334 can be bled for rigidly holding a load of a control valve position, both working chambers 333, 334 can ventilated, depending upon the switch position of the switch valve of the I/P-transducers 321, 322.

In case the microelectronics recognizes failure of the I/P-transducer 321, the microelectronics 50 controls the pneumatic signal switch valve 340 such that the control signal $S_1$ is blocked such that the control signal $S_2$ is transferred to the first working chamber 333. Simultaneously, the microelectronics 15 controls the I/P-transducer 323 as well as the pneumatic signal switch valve 342 such that the control signal $S_2$ is blocked from passing into the second working chamber 334 and such that the control signal $S_3$ is allowed to pass through. Through this switching, an identical control function can be maintained in spite of the failure of one I/P-transducer.

The features disclosed in the above-mentioned description, the figures and the claims can be of importance in any combination thereof for realizing the different exemplary embodiments Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A position controller for a pneumatic field device of a process plant, comprising:
   a current-pressure transducer system having at least two I/P-transducers creating at least two separate pneumatic control signals;
   microelectronics creating at least two electrical control signals for the at least two I/P-transducers;
   a pneumatic signal switch valve having at least two pneumatic inputs for the at least two pneumatic control signals, a pneumatic output for transferring a pneumatic control signal to a working chamber of the pneumatic field device, and an electrical switch signal input; and
   the pneumatic signal switch valve comprising a first switch position in which it blocks a first of the at least two pneumatic control signals and a second switch position in which it blocks a second of the at least two pneumatic control signals.

2. The position controller according to claim 1 wherein the microelectronics is configured to switch at least one of the pneumatic signal switch valve and a pneumatic supply switch valve also having first and second switch positions between the first and the second switch positions in case of a predetermined operating condition.

3. The position controller according to claim 1 wherein the pneumatic signal switch valve comprises at least one of a switch condition in which several of the at least two pneumatic inputs are connected to the pneumatic output and the pneumatic signal switch valve comprising a further switch condition in which all of the pneumatic control signals are blocked.

4. The position controller according to claim 1 wherein the microelectronics is configured such that, in case of a predetermined operating condition at least one of the at least two electrical control signals is deactivated and one further of the at least two electrical control signals is activated.

5. The position controller according to claim 1 wherein the microelectronics is connected to a positioning sensor determining at least one of a valve position of a final control and a respective position of a moveable I/P-transducer, and comprising a pressure sensor for determining a respective pressure of the pneumatic control signal and configured for detecting a predetermined operating condition depending on at least one of the valve position, a position of the movable I/P-transducer, a control signal pressure, and an electrical control signal.

6. The position controller according to claim 1 wherein the microelectronics are configured for storing at least one of the operating parameters at least one reference time curve of a valve position of a final control position of at least one moveable I/P-transducer, a pressure of at least one of the at least two pneumatic control signals, one of the at least two electrical control signals, and a relation of one of the aforementioned operating parameters and one or more others of the aforementioned operating parameters, and configured for comparing a stored reference curve to a currently measured curve for detecting a preconfigured operating condition.

7. The position controller according to claim 1 wherein the pneumatic signal switch valve comprises at least one of an electrically switchable piston mechanism having several switch positions and a 3/2-way control valve.

8. The position controller according to claim 1 wherein the at least two I/P-transducers each comprise a pneumatic amplifier for increasing an amount of air of the at least two pneumatic control signals, and wherein at least two pneumatic amplifiers are connectable via a pneumatic supply switch valve to a pneumatic supply, the pneumatic supply switch valve having a first switch position in which it connects one of the at least two pneumatic amplifiers to a pneumatic supply and a second switch position in which it connects the other one of the at least two pneumatic amplifiers to the pneumatic supply to separate the first of the at least two pneumatic amplifiers from the pneumatic supply.

9. The position controller according to claim 1 which for driving a double-acting actuator of a pneumatic final control comprises two pneumatic signal switch valves with at least two respective inputs for at least two pneumatic control signals, and one respective pneumatic output for transferring one pneumatic control signal to one respective working chamber of the double-acting actuator and one respective electrical switch signal input.

10. The position controller according to claim 1 wherein the microelectronics and the current-pressure transducing system are arranged within a common controller housing.

11. A position controller for a pneumatic field device of a process plant, comprising:
    a current-pressure transducer system having at least two I/P-transducers creating at least two separate pneumatic control signals;

microelectronics creating at least two electrical control signals for the at least two I/P-transducers;

a pneumatic signal switch valve having at least two pneumatic inputs for the at least two pneumatic control signals, only one pneumatic output for transferring only one pneumatic control signal to a working chamber of the pneumatic field device, and only one electrical switch signal input; and the pneumatic signal switch valve comprising a first switch position in which it blocks a first of the at least two pneumatic control signals and a second switch position in which it blocks a second of the at least two pneumatic control signals.

* * * * *